C. E. HECHT.
BRUSH HANGER.
APPLICATION FILED MAR. 5, 1921.
1,397,807. Patented Nov. 22, 1921.
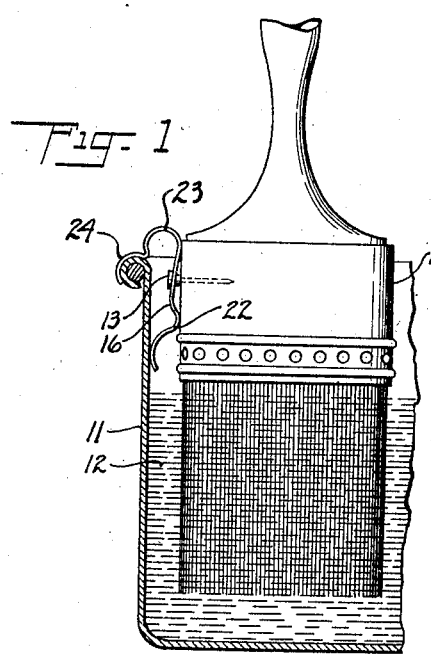
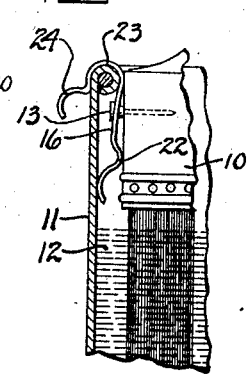
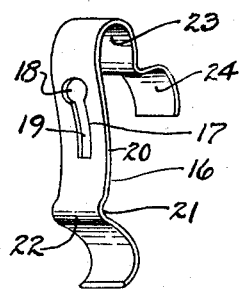
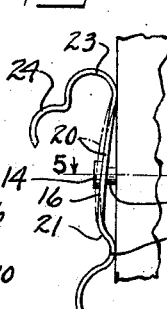
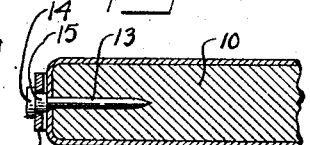
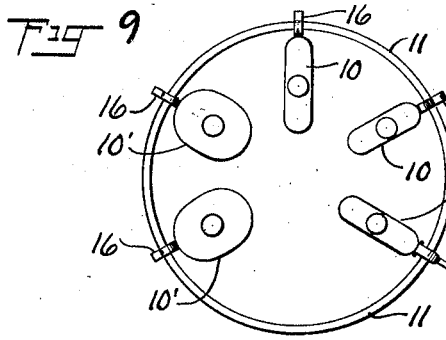
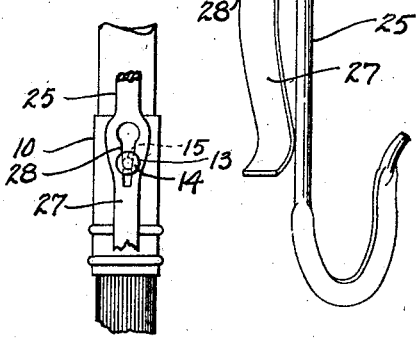
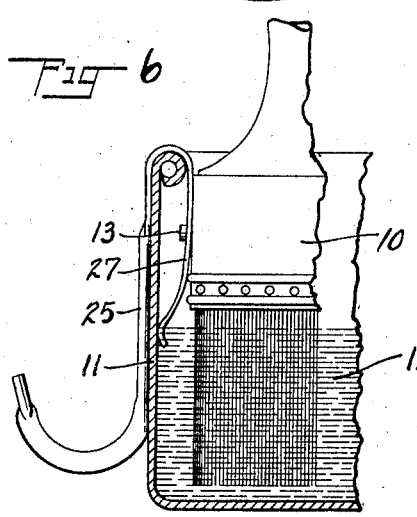
Inventor
Charles E. Hecht
By his Attorney
H. H. Dyke

UNITED STATES PATENT OFFICE.

CHARLES E. HECHT, OF IRVINGTON, NEW JERSEY.

BRUSH-HANGER.

1,397,807.  Specification of Letters Patent.  Patented Nov. 22, 1921.

Application filed March 5, 1921. Serial No. 449,719.

*To all whom it may concern:*

Be it known that I, CHARLES E. HECHT, a citizen of the United States, and a resident of Irvington, county of Essex, and State of New Jersey, have invented certain new and useful Improvements in Brush-Hangers, of which the following is a specification.

My invention relates to brush hangers for suspending paint, varnish and the like brushes in a suitable liquid such as water or oil.

Among the objects of the invention are the production of a device of great simplicity, which avoids all complications in brush manufacture; the provision of a hanger hook separable from the brush, yet readily and securely attached thereto, and of a form adapted to suspend the brush in substantially vertical position in pots having edges of various forms; the attachment of brush to hook in such manner that, while same can be readily connected or separated, yet when attached the hook is clamped upon the brush and when the brush is suspended by the hook it will hang straight and hold its position without turning or tilting; the provision of a hanger whereby the brush is held away from the side of the pot, so that paint, or varnish from the inner wall of the pot will not come into contact with or get on the brush; and the provision of a brush hanger hook adapted to be used, when not in use for brush suspending purposes, as a pot hook or hook for hanging paint pots from ladder rungs or the like. Further and related objects will appear in connection with the following description.

The drawing shows preferred embodiments of the invention for purposes of illustration and not for limitation of the invention. Figure 1 is a part sectional view showing a brush hung in a pot with an outwardly turned bead. Fig. 2 is a fragmentary view similar to part of Fig. 1, but showing a brush hung in a pot with an inturned bead. Fig. 3 is a perspective view of the hook of Figs. 1 and 2. Fig. 4 is a side view of the hook of Figs. 1, 2 and 3 clamped upon a brush. Fig. 5 is a cross section on line 5—5, Fig. 4. Fig. 6 is a view similar to Fig. 1, showing a hanger hook adapted also for use as a pot hook. Fig. 7 is a detail side view showing how the hook may be clamped to the brush by wedging action. Fig. 8 is a perspective view of a combined hanger and pot hook, and Fig. 9 is a plan view of a pot with brushes hung therein.

Reference character 10 is applied to designate a brush which may be of any form, as a flat paint brush, an oval varnish brush, etc. The invention is illustrated herein in connection with a flat paint brush. The brush or a number of brushes are suspended in the pot 11, which contains liquid to keep the brush in condition, such as water or oil 12. With flat brushes, such as shown, same are preferably suspended so as to extend radially of the pot, thus making it possible to arrange the maximum number of brushes in a pot and to have all brushes out of contact with one another.

The brush is made in the usual way with the sole exception that a headed member is secured therein at the point from which the brush is to be supported. In the form shown this member has the form of a nail 13 having a head 14 and a shouldered portion 15 which prevents the nail being driven in too far.

A separate hook is provided which has means for engaging the headed member and is also provided with means for engaging the upper margin of the side wall of a pot or vessel. The hook 16 shown in Figs. 1–5 has a key-slot 17 comprising the enlarged portion 18 and the communicating narrower portion 19. The head 14 of nail 13 is readily passed through the hole 18, but not through the portion 19 into which the shouldered portion 15 of the nail passes upon slight relative movement of the brush and hook. To clamp the hook and brush together so as to avoid tilting or canting when the hook is hung in the pot I preferably so form the portion 20 of the hook 16 that it is normally bowed or bent outward from the adjacent side of the brush, and sliding the hook up on the brush results in drawing the bowed part 20 inwardly toward the brush and compressing or flattening the same, as indicated in Fig. 4.

A convenient way to secure this result is by providing a reversely curved portion 21 below the key slot 17, thus forming a nose 22, which abuts against the brush at this point. Thus the hook bears against the brush at separated points or regions located respectively above and below the headed member 13, and is clamped in place by the member 13 engaging the key slot 17 in the intermediate portion 20 which normally bows or bends outwardly as shown in dotted lines in Fig. 4, but is compressed to the full line position of Fig. 4, thus holding the parts in securely clamped relation, yet the hook can readily be removed by pushing it down in the brush. If any paint has collected or dried on the member 13, same is removed by the operation of engaging the hook member therewith so that the suspension means of the present invention may properly be referred to as self-clearing.

The hook 16 is shown provided with two hooking recesses, the inner one 23 being adapted to hook over the inturned bead type or pot as shown in Fig. 2, and the outer one 24 being adapted to hook over the outwardly turned bead type of pot as shown in Fig. 1. It will be seen that in either case the hook holds the brush so as to hang vertically and well away from the side of the pot so that no paint or varnish can get on the brush from the wall of the pot.

In the form shown in Figs. 6-8, a pot hook 25 is adapted to serve also as a brush suspending hook by being provided with a key slot 26 to receive the headed member 13. A clamping action may be secured in the manner already described, but where the leaf 27 of the hook 25 is flat, and can not conveniently be bowed, I prefer to make the portion 28 of the slot 26 of wedge form so that the shank of headed member 13 is wedged tight therein upon relative up and down movement of the brush and hook, as shown in Fig. 8, in which it appears that the shouldered portion 15 of the member 13 is wedged tight in place before reaching the bottom of the wedge shaped slot portion 28.

The clamping action thus secured is sufficient to prevent canting or tilting the brush when hung in place. The wedge-shaped slot and tension obtained from bowing or bending the material of the hook may both be used for securing a clamping effect, if desired.

The operation of the device consists merely in attaching the hook to the brush by bodily movement of brush or hook relative to one another in the manner described, and hooking the hook over the edge of the pot, which operations are reversed when the brush is wanted for use. If it is desired to hang the brush in a shallow pot, it may be suspended by the pot hook shown in Fig. 6, and adjusted up and down to any desired height in the pot, the clamping arms 25 and 27 of the pot hook serving to support the brush at the desired height and out of contact with the bottom of the pot by their clamping action upon the pot wall 11 received therebetween. This feature is of advantage, even in deeper pots, since it enables the painter to adjust his brushes both to the level of the liquid contained in the pot and to the length of bristles in the brush, so as to always secure the immersion of the brush to the correct depth. Thus the tension given to the arms of the pot hook to prevent its coming off the bail of a paint pot in use in painting is utilized, when the pot hook is used for brush hanging purposes, to secure correct support and adjustments of the brush in the pot. The invention may be used to equal advantage with brushes of various forms and shapes. For example, the elliptical varnish brushes 10' shown in Fig. 9 may be suspended as readily and in the same manner as the flat brushes 10.

It will be seen that by the present invention the correct hanging of brushes in a proper liquid is accomplished in a most simple and inexpensive manner. So far as the brush itself is concerned, only a nail, screw or the like, with its head projecting slightly is required. The hook is a simple sheet metal stamping of practically negligible cost and is well adapted for display of an advertising inscription. Or the ordinary pot hook may be provided with the key-slot and made to serve this additional purpose as well as its ordinary function of suspending a paint pot from a ladder, thus not only affording a useful function for the pot hook when painting operations are discontinued temporarily, but making provision against loss of pot hooks by being mislaid.

I claim:

1. In a brush hanger, a holding member secured to the brush, and a hook member having a part adapted to extend over the rim of a pot and a part adapted to extend substantially vertically on the inner side of the pot wall and said last named part being provided with means to detachably and separately engage said holding member, whereby the hook member by bodily movement of brush or hook relative to one another may be secured to the brush or completely detached therefrom at will.

2. In a brush hanger, a headed member secured to the brush, and a hook member having a part adapted to extend over the rim of a pot and a part adapted to extend on the inner side of the pot wall and said last named part being provided with a key hole slot to detachably and separately engage said headed member, whereby the hook member may be secured to the brush or completely detached therefrom at will.

3. In a brush hanger, a shouldered and headed nail adapted to be driven into a brush until stopped by the shoulder, and a hook member comprising a part adapted to extend over the rim of a pot and a part adapted to extend on the inside of the pot wall, said last named part being provided with means adapted to be detachably clamped to the projecting portion, of the nail.

4. In a brush hanger, a shouldered and headed nail adapted to be driven into a brush head until stopped by the shoulder, and a hook member comprising a part adapted to extend over the rim of a pot and a part adapted to extend on the inside of the pot wall, said last named part having a key slot adapted to engage and hold the nail by its projecting portion and thereby suspend the brush within the pot.

5. In a brush hanger, a headed member permanently secured in the brush, and a hook member having a part adapted to be hooked over the edge of a pot and having a part adapted to extend inwardly away from the pot wall, the last named part being provided with means adapted to separably engage said headed member, whereby the brush may be suspended in the pot by said hook at a substantial distance inwardly from the wall of the pot.

6. In a brush hanger, a headed member permanently secured in a brush head, and a hook having a part adapted to extend over the edge of a pot and a part adapted to extend downwardly within the pot, said last named part having a detachable key slot connection with said headed member, the largest opening of the key slot being of sufficient dimension to permit the headed member to pass therethrough, whereby the hook may be secured to the brush to suspend the same in the pot or may be completely detached therefrom at will.

7. In a brush hanger, a headed member permanently secured in a brush head, and a hook having a part adapted to extend over the wall of the pot and a part adapted to extend downwardly within the pot, said last named part having a key slot formed therein comprising a relatively enlarged portion through which said headed member may pass and a relatively narrowed substantially wedge shaped portion in which said headed member is adapted to be received and clamped by wedging action.

8. A headed member permanently secured to a brush head and extending laterally therebeyond, and a hook member providing a part to extend over a pot wall and a part to extend within the pot, the last named part having a key slot therein to detachably receive the headed member and arranged at such an angle that the headed member is drawn theretoward as the headed member is moved toward the bottom of the slot.

9. As a new article of manufacture, a pot hook for painters having the hook member thereof normally used to engage a pot bail adapted to engage the wall of a pot and to provide a part extending over the rim of the pot and a part extending downwardly therein, said last named part being provided with means to detachably engage a holding member in a brush head by bodily movement of brush or hook relative to one another, whereby the pot hook is adapted to suspend a brush in a pot as well as to serve the usual functions of a pot hook.

10. As a new article of manufacture, a pot hook for painters having the hook member thereof normally used to engage a pot bail adapted to engage the wall of a pot and to provide a part extending over the rim of the pot and a part extending downwardly therein, said last named part being provided with a key slot to engage a headed member on a brush head, whereby the pot hook is adapted to suspend a brush in the pot as well as to serve the usual functions of a pot hook.

11. In a brush hanger, a headed member adapted to be permanently secured in a brush head with its head projecting somewhat therebeyond, and a hook member having a key slot formed therein, the portion of the hook member wherein the key slot is formed being normally bowed away from the brush head and being adapted to be compressed toward the brush head when the headed member is inserted in the key slot, whereby the hook is firmly clamped to the brush and the latter prevented from turning or tilting with respect to the hook.

12. A hook member comprising a relatively long loop made up of two arms and a connecting portion, the last named portion being adapted to extend over the rim of a pot and the arms to frictionally engage the pot wall on opposite sides thereof, and means on the arm inside the pot for detachably engaging a holding means on a brush head, whereby a brush may be suspended within a pot and adjusted up or down with respect thereto.

In testimony that I claim the foregoing, I have hereto signed my name.

CHARLES E. HECHT.